L. R. Cavender,
Table-Leaf Support,
Nº 56,005.                 Patented July 3, 1866.
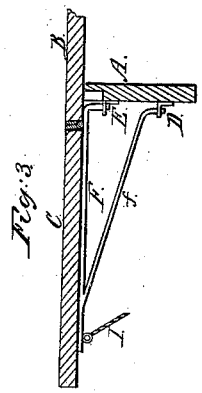
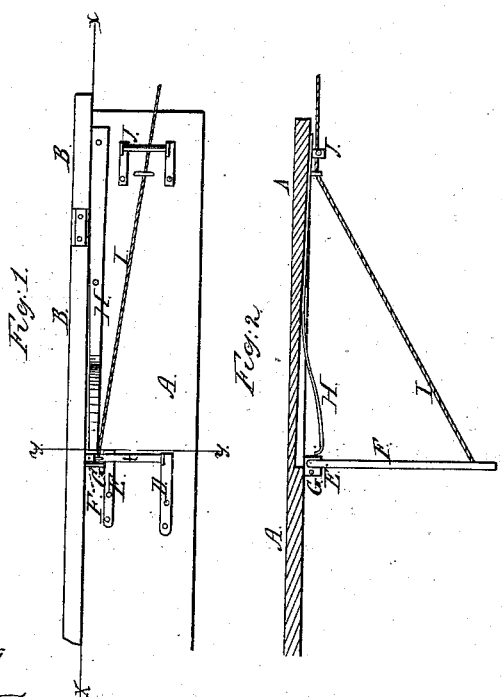
Witnesses;
Jas. A. Service,
G. W. Bloungton.
Inventor;
L. R. Cavender
Per Munn & Co.
Attorneys.

UNITED STATES PATENT OFFICE.

L. R. CAVENDER, OF EUREKA, ILLINOIS.

IMPROVED TABLE-LEAF SUPPORT.

Specification forming part of Letters Patent No. 56,005, dated July 3, 1866.

*To all whom it may concern:*

Be it known that I, L. R. CAVENDER, of Eureka, in the county of Woodford and State of Illinois, have invented a new and useful Improvement in Table-Leaf Supports; and I do hereby declare that the following is a full, clear, and exact description thereof, which will enable others skilled in the art to make and use the same, reference being had to the accompanying drawings, forming part of this specification, in which—

Figure 1 is a side view of a portion of a table with my improvement attached, the leaf being removed. Fig. 2 is a horizontal section of the same, taken through the line $xx$, Fig. 1. Fig. 3 is a vertical cross-section of the same, taken through the line $yy$, Fig. 1, a leaf being represented as attached thereto.

Similar letters of reference indicate like parts.

My invention has for its object to furnish a simple, convenient, and safe support for a table-leaf; and it consists in an improved table-leaf support formed by combining the pivoted arm, the spring, and cord with each other and with the frame of the table, as hereinafter more fully described.

A is one of the horizontal bars of the table-frame. B is the top of the table, to which the leaf C is hinged in the ordinary manner.

To the side of the frame A are attached two metallic straps, D and E, having projecting eyes, to which the supporting-bar is pivoted. The horizontal part of the support F, when open, extends from near the front edge of the table-leaf C almost to the bar A of the table-frame, at which point it is bent down at right angles, and is pivoted to the eye E, as shown in Fig. 3.

$f$ is a brace extending from near the forward end of the said horizontal arm F to the lower part of the side bar, A, of the frame, and is pivoted to the eye D, as shown in Fig. 3. This brace $f$ strengthens the horizontal bar or arm F, so that it may be made lighter than would otherwise be necessary.

G is a stop, one end of which is attached to the eye of the strap E and the other end to the projecting edge of the top B of the table. This stop G is designed to prevent the arm F from being thrown back too far when the leaf C is raised.

H is a spring, which, when pressed down, lies in a groove formed in the side of the bar A of the table-frame. The elasticity of this spring H, as soon as the leaf C is raised, forces the support F out into the position shown in Fig. 2.

I is a cord attached to the end of the arm F; thence it is carried forward over a roller or pulley, J, and brought into a position where it can be conveniently reached to draw the arm F back to enable the leaf C to be closed or lowered. By this arrangement, as soon as the leaf is raised the spring H forces the arm F out into the proper position for supporting the said leaf.

The stop G prevents the arm F from opening too far, and the projecting end of the spring H prevents it from returning, so that the leaf cannot be lowered until the spring H has been pressed down by drawing the said bar F against it by the cord I.

I claim as new and desire to secure by Letters Patent—

An improved table-leaf support formed by combining the pivoted arm F, the spring H, and cord I, constructed and arranged, substantially as herein described, with each other and with the frame A of the table, for the purpose set forth.

L. R. CAVENDER.

Witnesses:
F. M. HOYT,
W. R. ADAMS.